(12) United States Patent
Weisberger et al.

(10) Patent No.: US 11,580,600 B2
(45) Date of Patent: Feb. 14, 2023

(54) DISTRIBUTED CRYPTO-CURRENCY SMART ORDER ROUTER WITH COST CALCULATOR

(71) Applicant: CoinRoutes Inc., New York, NY (US)

(72) Inventors: David Marc Weisberger, New York, NY (US); Ian Joseph Weisberger, New York, NY (US)

(73) Assignee: CoinRoutes Inc., New York, NY (US)

( * ) Notice: Subject to any disclaimer, the term of this patent is extended or adjusted under 35 U.S.C. 154(b) by 186 days.

(21) Appl. No.: 16/754,059

(22) PCT Filed: Dec. 5, 2018

(86) PCT No.: PCT/US2018/064115
§ 371 (c)(1),
(2) Date: Apr. 6, 2020

(87) PCT Pub. No.: WO2019/071278
PCT Pub. Date: Apr. 11, 2019

(65) Prior Publication Data
US 2020/0327611 A1 Oct. 15, 2020

Related U.S. Application Data (63) Continuation of application No. 15/727,628, filed on Oct. 8, 2017, now abandoned.
(Continued)

(51) Int. Cl.
| G06Q 40/00 | (2012.01) |
| G06Q 40/04 | (2012.01) |
| G06Q 40/06 | (2012.01) |
| G06Q 20/06 | (2012.01) |
| G06Q 20/36 | (2012.01) |

(52) U.S. Cl.
CPC ......... G06Q 40/04 (2013.01); G06Q 20/0658 (2013.01); G06Q 20/3672 (2013.01); G06Q 40/06 (2013.01)

(58) Field of Classification Search
CPC .... G06Q 40/00; G06Q 40/04; G06Q 20/0658; G06Q 20/3672; G06Q 40/06
See application file for complete search history.

(56) References Cited

U.S. PATENT DOCUMENTS

| 10,269,009 B1 | 4/2019 | Winklevoss et al. |
| 10,354,325 B1 | 7/2019 | Skala et al. |

(Continued)

FOREIGN PATENT DOCUMENTS

| CN | 111083148 A | * | 4/2020 |
| KR | 101694455 B1 | | 1/2017 |
| WO | 2019071277 A1 | | 4/2019 |

OTHER PUBLICATIONS

CrySIL: Bringing Crypto to the Modern User F Reimair, P Teufl, T Zefferer—11th International Conference on Web . . . , 2015— Springer (Year: 2015).*
Final Office Action dated Nov. 10, 2021, for U.S. Appl. No. 16/963,168, filed Jul. 17, 2020, 30 pages.
XTrade, XTrade.IO Simplifies Crypto Trading via Ethereum Token, Nov. 13, 2017, M2 Presswire, pp. 1-3 (Year: 2017).
(Continued)

*Primary Examiner* — Lalita M Hamilton
(74) *Attorney, Agent, or Firm* — Morrison & Foerster LLP (57) ABSTRACT

A distributed cryptocurrency smart order router (DCCSOR) is disclosed, which allows clients to keep control of their own private and exchange keys to their wallets and accounts, but can execute orders across multiple exchanges simultaneously.

15 Claims, 7 Drawing Sheets

DCCSOR System Flow
The top row of exchanges is meant to depict all exchages that clients are eligible to trade on, including, at the current time, GDAX, Kraken, Bitfinex, Gemini, Poloniex, Bittrex, & Hitbtc. The two virtual private clouds depicted are for a distributed client and the central VPC that houses the market data and decision engines, although a version of the distributed SOR can also run centrally.

Related U.S. Application Data (60) Provisional application No. 62/569,613, filed on Oct. 8, 2017.

(56) References Cited

U.S. PATENT DOCUMENTS

| | | |
|---|---|---|
| 2005/0137962 A1 | 6/2005 | Penney |
| 2005/0222936 A1 | 10/2005 | Panariti |
| 2006/0015439 A1 | 1/2006 | Brann |
| 2006/0136318 A1 | 6/2006 | Rafieyan |
| 2007/0118453 A1 | 5/2007 | Bauerschmidt |
| 2008/0082439 A1 | 4/2008 | Everaert |
| 2010/0293110 A1 | 11/2010 | Rosenthal |
| 2011/0153521 A1 | 6/2011 | Green |
| 2013/0262287 A1 | 10/2013 | Parsons et al. |
| 2015/0081508 A1 | 3/2015 | Schwall |
| 2015/0356679 A1 | 12/2015 | Schmitt |
| 2015/0363769 A1 | 12/2015 | Ronca |
| 2015/0363770 A1 | 12/2015 | Ronca |
| 2015/0363773 A1 | 12/2015 | Ronca |
| 2015/0363778 A1 | 12/2015 | Ronca |
| 2015/0363782 A1 | 12/2015 | Ronca |
| 2016/0078538 A1 | 3/2016 | Katsuyama |
| 2016/0125533 A1 | 5/2016 | Davis |
| 2016/0292672 A1 | 10/2016 | Fay |
| 2016/0342977 A1 | 11/2016 | Lam |
| 2017/0041296 A1* | 2/2017 | Ford .................... G06F 16/951 |
| 2017/0103391 A1 | 4/2017 | Wilson, Jr. |
| 2017/0109822 A1 | 4/2017 | Borkovec |
| 2017/0243289 A1 | 8/2017 | Rufo |
| 2018/0211319 A1 | 7/2018 | Schulz et al. |
| 2019/0108586 A1* | 4/2019 | Jayaram ................ G06Q 40/04 |
| 2019/0325515 A1 | 10/2019 | Weisberger |
| 2021/0125278 A1 | 4/2021 | Weisberger et al. |

OTHER PUBLICATIONS

Cboe, "Cboe Futures Exchange, LLC Product Certification for Bitcoin Futures Submission No. CFE-2017-018," Dec. 1, 2017, pp. 1-27. (Year: 2017).

Final Office Action dated Mar. 25, 2021, for U.S. Appl. No. 15/727,628, filed Oct. 8, 2017, seventeen pages.

Hays, D. K. et al. "Crypto research report," Dec. 2017, Incrementum AG, Ed. 1, pp. 1-60. (Year: 2017).

Non-Final Office Action dated Mar. 31, 2021, for U.S. Appl. No. 16/963,168, filed Jul. 17, 2020, twenty three pages.

International Search Report and Written Opinion for PCT Application No. PCT/US2019/14350, dated Apr. 15, 2019, eight pages.

European Search Repot dated Apr. 8, 2021, for EP Application No. 18864655.8, ten pages.

Ian Weisberger, et al. "CoinRoutes," Distributed, Intelligent Network Services for Trading Cryptocurrencies, Feb. 18, 2018, (original Nov. 6, 2017). Draft V 1.3, Retrieved from the Internet: URL:https://web.archive.org/web/20180815130524if_/http://coinroutes.com/CoinRoutes_v1.3_Whitepaper-2-18-18.pdf, on Mar. 29, 2021, *abstract* * p. 9-p. 28 *.

European Search Repot dated Apr. 28, 2021, for EP Application No. 18864471.0, ten pages.

Non-Final Office Action dated Oct. 30, 2020, for U.S. Appl. No. 15/727,628, filed Oct. 8, 2017, ten pages.

Final Office Action dated Mar. 18, 2020, for U.S. Appl. No. 15/727,628, filed Oct. 8, 2017, ten pages.

International Search Report and Written Opinion dated Mar. 15, 2019, for PCT Application No. PCT/US2018/64111, filed Dec. 5, 2018, ten pages.

Non-Final Office Action dated Oct. 16, 2019, for U.S. Appl. No. 15/727,628, filed Oct. 8, 2017, seven pages.

European Search Repot dated Feb. 23, 2022, for EP Application No. 19741599.5, seventeen pages.

* cited by examiner

FIG. 1

SOR / Cost Calculator Interface: Selection Box:
SOR BUY 500 BTC/USD Compared to GDAX Cost Calculator Symbol*
BTC/USD Quantity*
500

Side*
● buy  ○ sell

Single Exchange*
gdax

Exchanges*
×bittrex  ×bitfinex  ×poloniex  ×kraken  ×gdax  ×hitbtc  ×gemini

Submit

FIG. 2

SOR / Cost Calculator Results for BUY 500 BTC/USD:

SOR Results

Summary Stats

| Best Price | Executions | First Price | Last Price |
|---|---|---|---|
| 4578.6492137 | 213 | 4566.62 | 4585.56 |

Savings

| Percent Savings | Actual Savings | Net Consideration |
|---|---|---|
| 0.33% | 7661.829571 | 2289233.960685 |

SOR Results 500 BTC.JPG

| Price | Quantity | Exchange |
|---|---|---|
| 4566.62 | 1.211335695 | gemini |
| 4566.63 | 0.001 | gemini |
| 4567.12 | 0.00119948 | gemini |
| 4567.19 | 2.0517 | gemini |
| 4567.67 | 0.00425938 | gemini |
| 4567.68 | 0.00098281 | gemini |
| 4567.74 | 0.00382488 | gemini |
| 4567.75 | 0.000982 | gemini |
| 4567.76 | 0.00098326 | gemini |
| 4567.77 | 0.00120055 | gemini |
| 4567.78 | 0.00098145 | gemini |
| 4567.79 | 0.00120092 | gemini |
| 4567.8 | 0.0009815 | gemini |
| 4567.81 | 0.00120147 | gemini |
| 4567.82 | 0.00120147 | gemini |
| 4567.83 | 0.00120201 | gemini |
| 4567.84 | 0.00098125 | gemini |

Single Exchange 4593.9696 Single Exchange Price

| Price | Quantity | Exchange |
|---|---|---|
| 4569.88 | 1.6000 | gdax |
| 4569.88 | 0.0737 | gdax |
| 4569.89 | 0.1000 | gdax |
| 4569.98 | 0.0500 | gdax |
| 4569.98 | 0.9966 | gdax |
| 4569.98 | 0.0210 | gdax |
| 4569.99 | 50.0000 | gdax |
| 4569.99 | 0.0130 | gdax |
| 4570.00 | 0.0100 | gdax |
| 4570.00 | 2.0000 | gdax |
| 4570.00 | 0.1000 | gdax |
| 4570.00 | 0.5000 | gdax |
| 4570.00 | 1.0000 | gdax |
| 4570.00 | 1.0000 | gdax |
| 4570.00 | 0.0100 | gdax |
| 4570.10 | 0.0310 | gdax |
| 4570.10 | 0.0141 | gdax |
| 4570.12 | 0.8567 | gdax |
| 4570.29 | 3.5200 | gdax |
| 4570.32 | 4.0000 | gdax |
| 4571.30 | 2.2795 | gdax |
| 4571.59 | 0.2000 | gdax |
| 4571.87 | 0.0100 | gdax |
| 4571.87 | 0.0100 | gdax |

FIG. 3

SOR/ Cost Calculator Interface: Selection Box:
SOR SELL 500 ETH/USD compared to GEMINI

Cost Calculator

Symbol*
[ETH/USD]

Quantity*
[500]

Side*
○ buy  ●sell

Single Exchange*
[gemini ▼ ×]

Exchanges*
[×bittrex] [×bitfinex] [×poloniex] [×kraken] [×gdax] [×hitbtc] [×gemini]    × ⌀

[Submit]

SOR / Cost Calculator Results for SELL 500 ETH/USD

SOR Results

Summary Stats

| Best Price | Executions | First Price | Last Price |
|---|---|---|---|
| 313.0461705 | 33 | 313.18 | 313.0 |

Savings

| Percent Savings | Actual Savings | Net Consideration |
|---|---|---|
| 0.83% | 1283.953774 | 156523.085297 |

| Price | Quantity | Exchange |
|---|---|---|
| 313.18 | 13.716 | bitfinex |
| 313.17 | 40.5 | bitfinex |
| 313.16 | 0.38 | bitfinex |
| 131.16 | 6.013859 | bitfinex |
| 313.14 | 32.0 | bitfinex |
| 313.11 | 13.893 | hitbtc |
| 313.09 | 0.079 | hitbtc |
| 313.08 | 8.0 | bitfinex |
| 313.08 | 0.2156 | gdax |
| 313.08 | 25.0 | gdax |
| 313.08 | 0.03 | gdax |
| 313.08 | 5.0 | gdax |
| 313.08 | 38.9 | gdax |
| 313.07 | 2.0 | gdax |
| 313.05 | 0.78453243 | gdax |
| 313.03 | 0.2611 | gdax |
| 313.03 | 0.2611 | gdax |

Single Exchange

| | 310.4783 | Single Exchange Price |
|---|---|---|
| Price | Quantity | Exchange |
| 312.44 | 19.3803 | gemini |
| 312.43 | 12.0000 | gemini |
| 312.24 | 0.2061 | gemini |
| 312.23 | 3.0000 | gemini |
| 312.18 | 3.1700 | gemini |
| 312.14 | 16.0000 | gemini |
| 312.13 | 20.0000 | gemini |
| 312.11 | 4.0000 | gemini |
| 312.05 | 3.4000 | gemini |
| 312.00 | 3.0000 | gemini |
| 311.93 | 3.9000 | gemini |
| 311.88 | 3.0000 | gemini |
| 311.82 | 3.0000 | gemini |
| 311.80 | 28.4374 | gemini |
| 311.75 | 4.0000 | gemini |
| 311.69 | 4.0000 | gemini |
| 311.63 | 3.3900 | gemini |
| 311.55 | 3.8200 | gemini |
| 311.48 | 3.3900 | gemini |
| 311.42 | 4.0000 | gemini |
| 311.35 | 4.0000 | gemini |
| 310.74 | 0.4400 | gemini |
| 310.00 | 0.0010 | gemini |
| 309.86 | 0.0028 | gemini |

Cost Calculator

SOR / Cost Calculator Interface: Selection Box
SOR BUY 1000 ETH/BTC compared to GDAX Symbol*
ETH/BTC Quantity*
1000

Side*
⦿ buy  ○ sell

Single Exchange*
gdax

Exchanges*
[×bittrex] [×bitfinex] [×poloniex] [×kraken] [×gdax] [×hitbtc] [×gemini]

Submit

SOR / Cost Calculator Results for BUY 1000 ETH/BTC

SOR Results

Summary Stats

| Best Price | Executions | First Price | Last Price |
|---|---|---|---|
| 0.0842650 | 59 | 0.06833 | 0.06849064 |

Savings

| Percent Savings | Actual Savings | Net Consideration |
|---|---|---|
| 0.41% | 0.282794 | 68.426499 |

| Price | Quantity | Exchange |
|---|---|---|
| 0.06833 | 1.489 | kraken |
| 0.06834 | 3.0 | kraken |
| 0.068344 | 0.17214107 | bitfinex |
| 0.068345 | 16.0372 | bitfinex |
| 0.068346 | 0.25832633 | bitfinex |
| 0.068346 | 0.043868 | bitfinex |
| 0.06835 | 32.06 | kraken |
| 0.06835 | 20.11 | bitfinex |
| 0.06837 | 0.67 | gdax |
| 0.06838 | 21.03 | gdax |
| 0.06838591 | 9.39565216 | poloniex |
| 0.06838594 | 3.37437835 | poloniex |
| 0.068399 | 32.0742 | poloniex |
| 0.0684 | 244.061955 | gdax |
| 0.0684 | 30.0 | kraken |
| 0.0684 | 98.3728 | gemini |
| 0.068404 | 19.16104085 | bitfinex |

Single Exchange

| | Single Exchange Price |
|---|---|
| | 0.0687 |

| Price | Quantity | Exchange |
|---|---|---|
| 0.07 | 0.6700 | gdax |
| 0.07 | 21.0300 | gdax |
| 0.07 | 244.0620 | gdax |
| 0.07 | 32.0791 | gdax |
| 0.07 | 5.0000 | gdax |
| 0.07 | 5.0000 | gdax |
| 0.07 | 0.0100 | gdax |
| 0.07 | 0.2000 | gdax |
| 0.07 | 0.0099 | gdax |
| 0.07 | 0.0100 | gdax |
| 0.07 | 3.0000 | gdax |
| 0.07 | 4.3000 | gdax |
| 0.07 | 0.5900 | gdax |
| 0.07 | 4.3000 | gdax |
| 0.07 | 0.0282 | gdax |
| 0.07 | 4.0000 | gdax |
| 0.07 | 4.8000 | gdax |
| 0.07 | 0.2000 | gdax |
| 0.07 | 31.1718 | gdax |
| 0.07 | 0.0100 | gdax |
| 0.07 | 0.0141 | gdax |
| 0.07 | 0.0100 | gdax |
| 0.07 | 0.0100 | gdax |
| 0.07 | 7.6242 | gdax |

DISTRIBUTED CRYPTO-CURRENCY SMART ORDER ROUTER WITH COST CALCULATOR

CROSS REFERENCE TO RELATED APPLICATIONS

This application is a national stage application under 35 U.S.C. § 371 of International Application No. PCT/US2018/064115, filed Dec. 5, 2018, which claims priority to U.S. patent application Ser. No. 15/727,628, filed Oct. 8, 2017 and claims priority to U.S. Provisional Patent Application No. 62/569,613, filed Oct. 8, 2017.

BACKGROUND

The current structure of the Crypto-Currency[1] market is fragmented, poorly coordinated, and difficult for clients to navigate. Many of the exchanges which trade crypto-currency products require clients to use the exchange "wallets" and maintain control over client's ability to initiate trades on their order books. Investors, therefore, trade on one exchange at a time, despite multiple exchanges quoting the same product pairs[2], often at very different prices. As a result, clients can lack the ability to execute at the best available price, since quite often that would require trading, in whole or in part, on different exchanges simultaneously.

BRIEF SUMMARY OF THE INVENTION

The invention is the creation of a distributed cryptocurrency smart order router (DCCSOR), which allows clients to keep control of their own private and exchange keys to their wallets and accounts, but can execute orders across multiple exchanges simultaneously. The DCCSOR software is facilitated by a peering connection to a decision engine, which subscribes to an integrated data feed of exchange bids and offers to determine the optimal package of orders to send. This software is paired with a user interface that displays potential routing via a cost calculator function. The cost calculator displays both the optimal order package the router would send based on the order parameters at the time the calculator is invoked, while also displaying the predicted savings from using the DCCSOR vis a vis the execution capabilities of a single exchange. The router is context sensitive to each client's wallets and exchange relationships configured within the client's own network or private cloud to select the exchanges eligible to send orders to. The router also incorporates logic to determine when it would be optimal to transfer funds or cryptocurrencies between customer wallets, decentralized exchanges, and centralized exchanges to facilitate the transaction. The router utilizes an integrated data-structure which creates a custom view of the available bids or offers across all included exchanges to each eligible exchange based on that data, order parameters and statistical analysis.

FIGURES DEPICTING SYSTEM FLOW AND SCREEN CAPTURES OF WORKING SYSTEM

DETAILED DESCRIPTION AND BEST MODE OF IMPLEMENTATION

The Distributed Crypto-Currency Smart Order Router (DCCSOR) is a system for clients to use to transact in cryptocurrencies at optimal prices. All cryptocurrency products are represented by a pair of currencies. In each product pair, the first is a cryptocurrency that is the primary product being traded, and the second can be either a crypto or fiat currency, which is also referred to as the pricing currency. For the sake of clarity, two product examples to illustrate both types of product-pairs are BTC-USD and BTC-ETH. In the example of BTC-USD, Bitcoin is the primary product and US Dollars is the pricing currency. In the example of BTC-ETH, Bitcoin is also the primary product but Ethereum is the pricing currency.

Design: The smart order router is designed to operate within the clients Virtual Private Cloud (VPC) and, therefore, allows its users to maintain control of their wallets and exchange API keys to interact with the exchanges that the DCCSOR sends orders to. This unique method of interaction means that the only information that needs to be transferred to the Virtual Private Cloud where the market data, decision engine and centralized UI services reside are the order parameters and Metadata. Metadata includes the information relevant to the selected cryptocurrency pair that is needed to determine what exchanges are eligible for the client as well as the position information at each exchange that determines the buying or selling quantity limits at each. The SOR will interact with each exchange on the client's behalf as if the client were exclusively trading on that exchange. The exchanges require their users to enter their Exchange API keys to trade with their platform and the instance of the DCCSOR within the client VPC will do so, but those keys never get transferred anywhere other than the exchanges.

Figure 1:
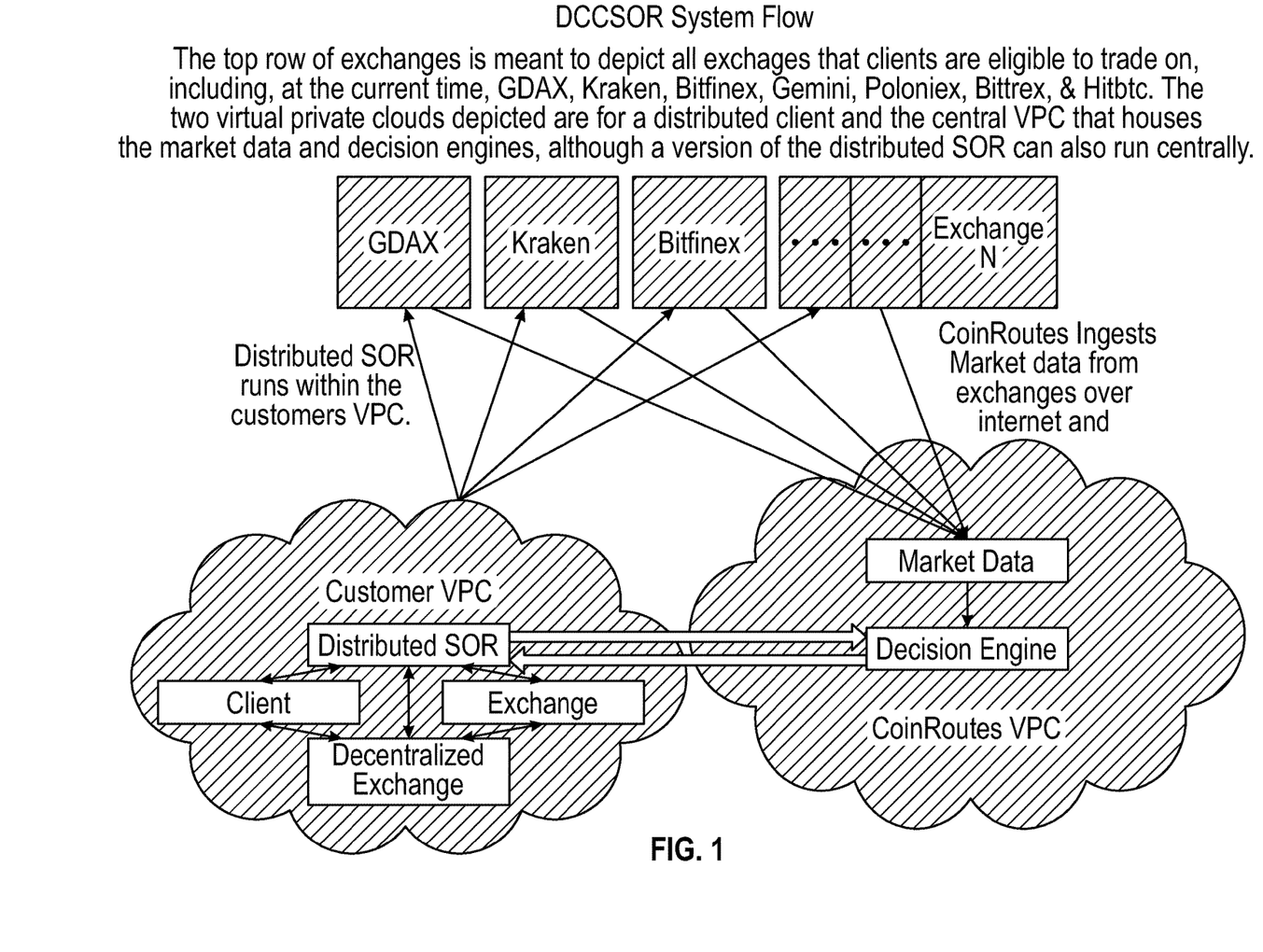
FIG. 1 shows the system flow including the deployment of components in both client and systems own virtual private cloud and the process flow detailing client control over their wallet and exchange keys.
Figure 2:
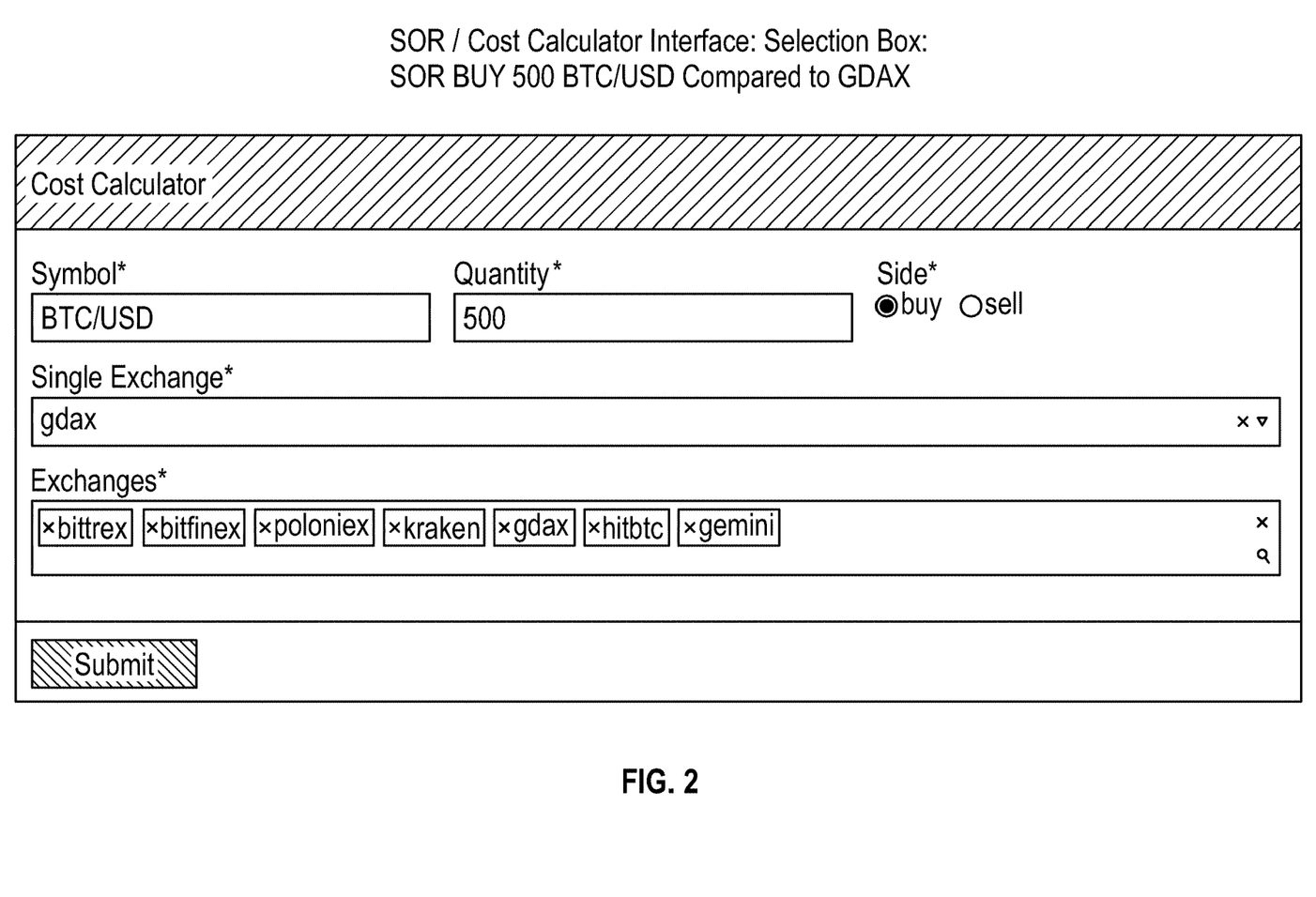
FIG. 2 shows the selection box of the working user interface where the user selected a BUY order for 500 BTC denominated in USD compared to GDAX as a single exchange.
Figure 3:
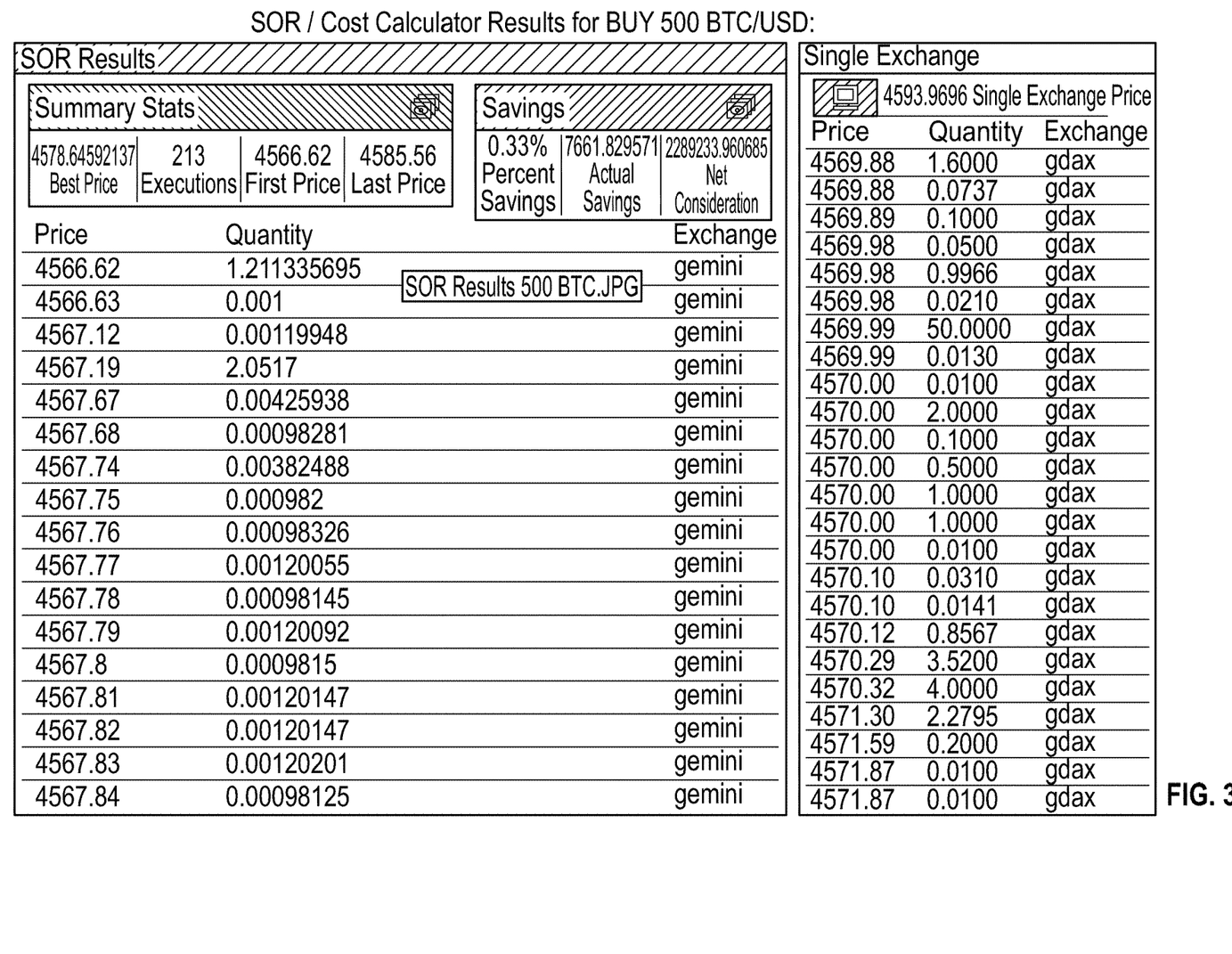
FIG. 3 shows the results from the working user interface where the user selected a BUY order for 500 BTC denominated in USD, compared GDAX as a single exchange.
Figure 4:
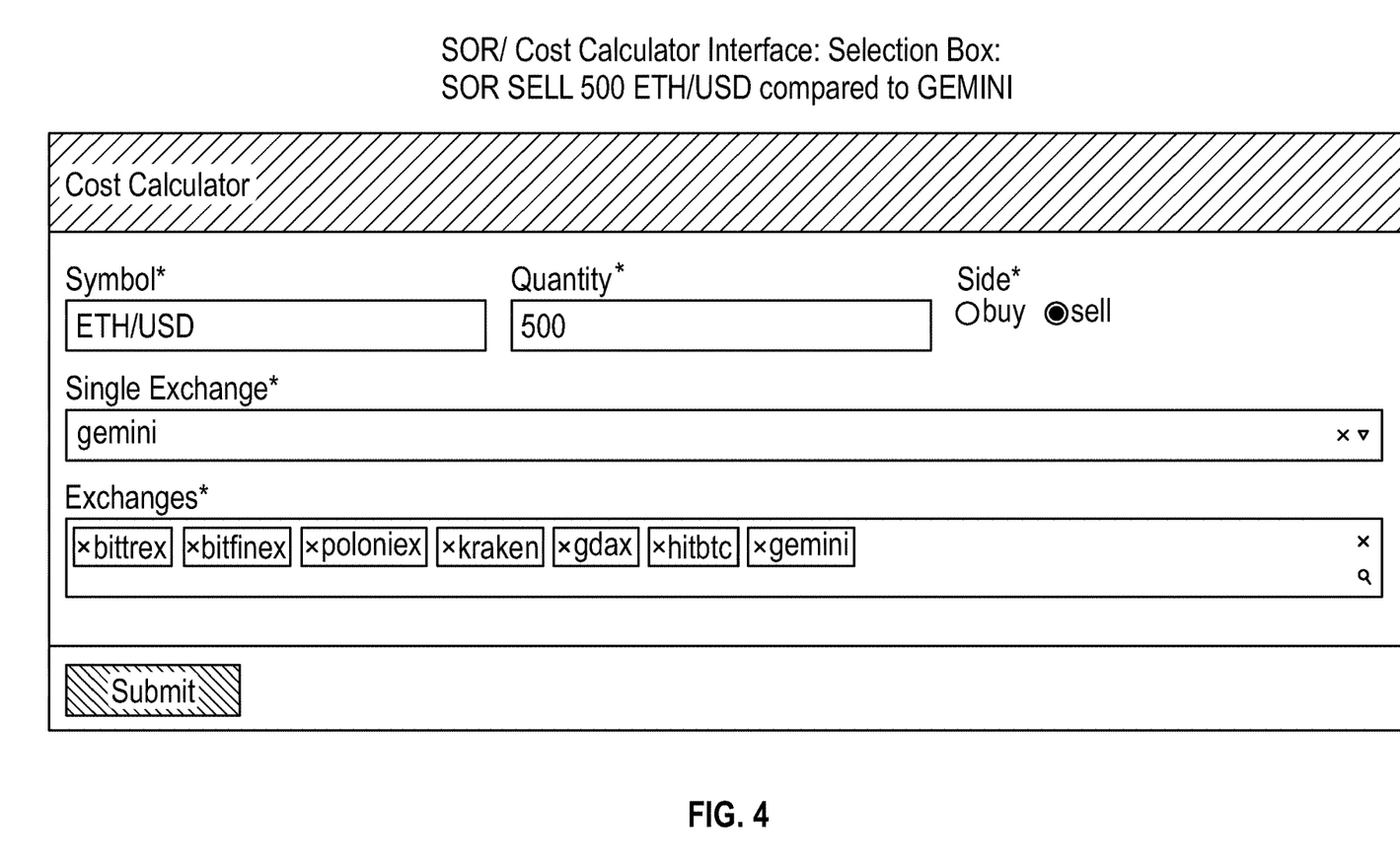
FIG. 4 shows the selection box of the working user interface where the user selected a SELL order for 500 ETH denominated in USD, compared to Gemini as a single exchange.
Figure 5:
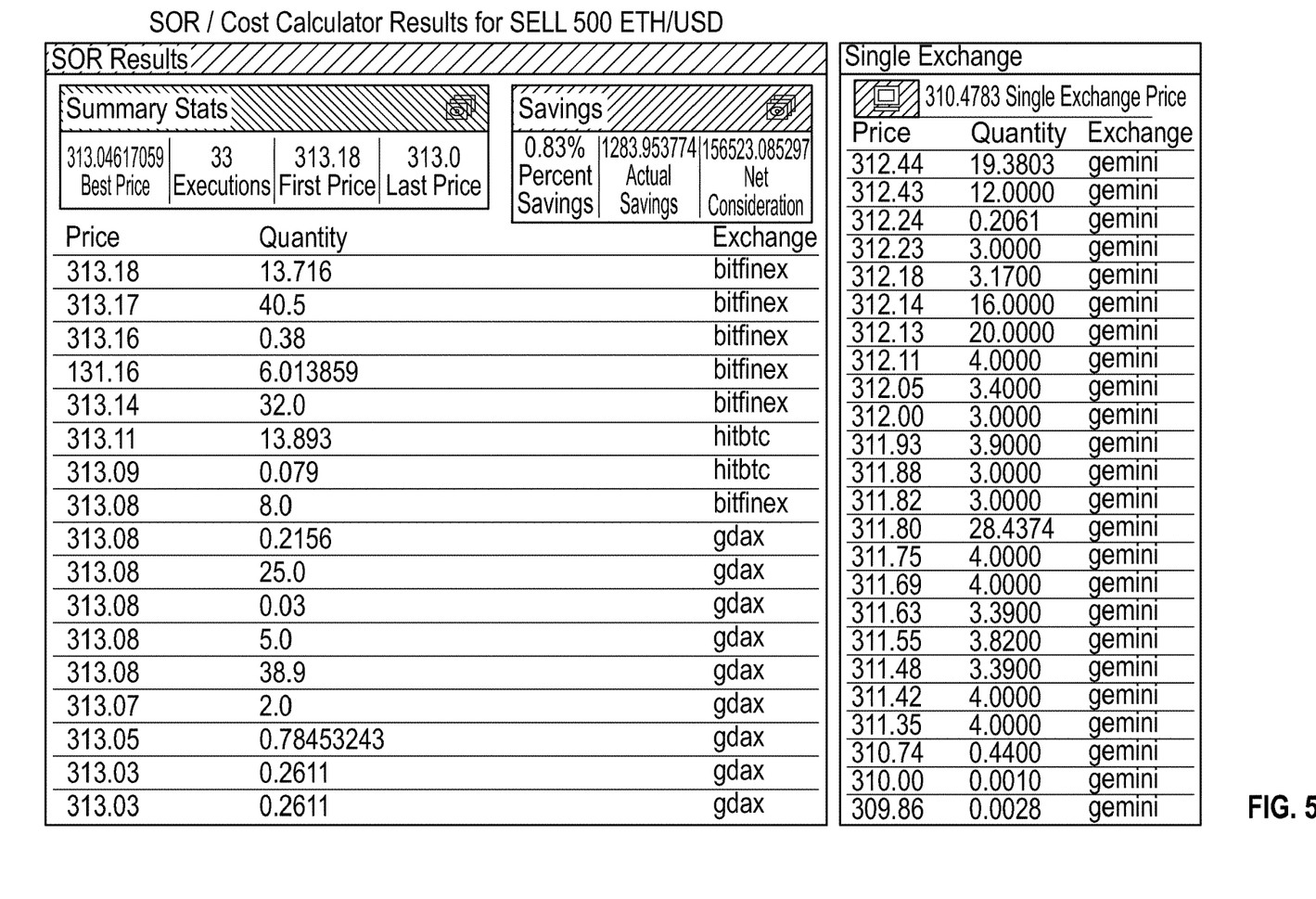
FIG. 5 shows the results from the working user interface where the user selected a SELL order for 500 ETH denominated in USD, compared to Gemini as a single exchange.
Figure 6:
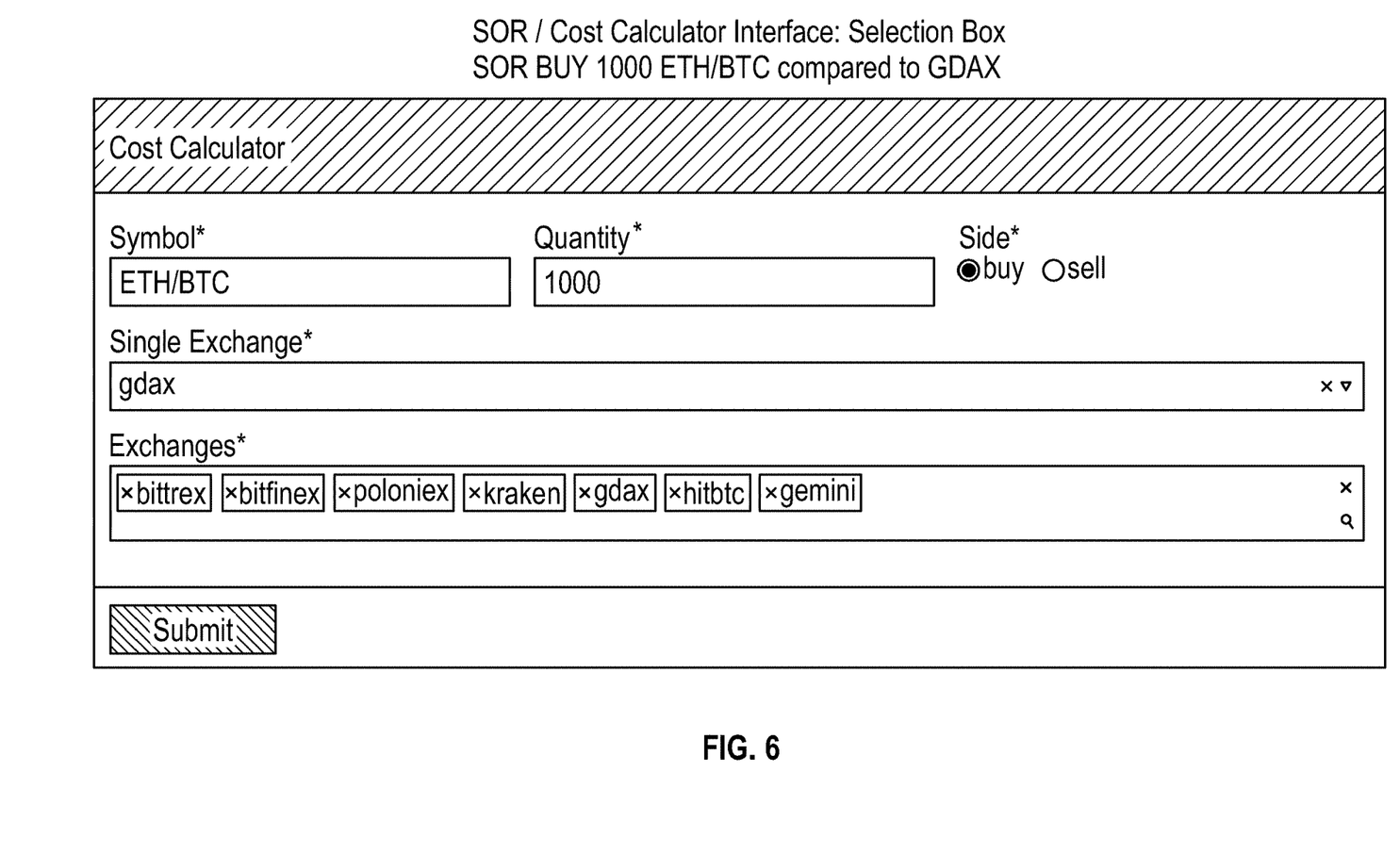
FIG. 6 shows the selection box of the working user interface where the user selected a BUY order for 1000 ETH denominated in BTC, compared to GDAX as a single exchange.
Figure 7:
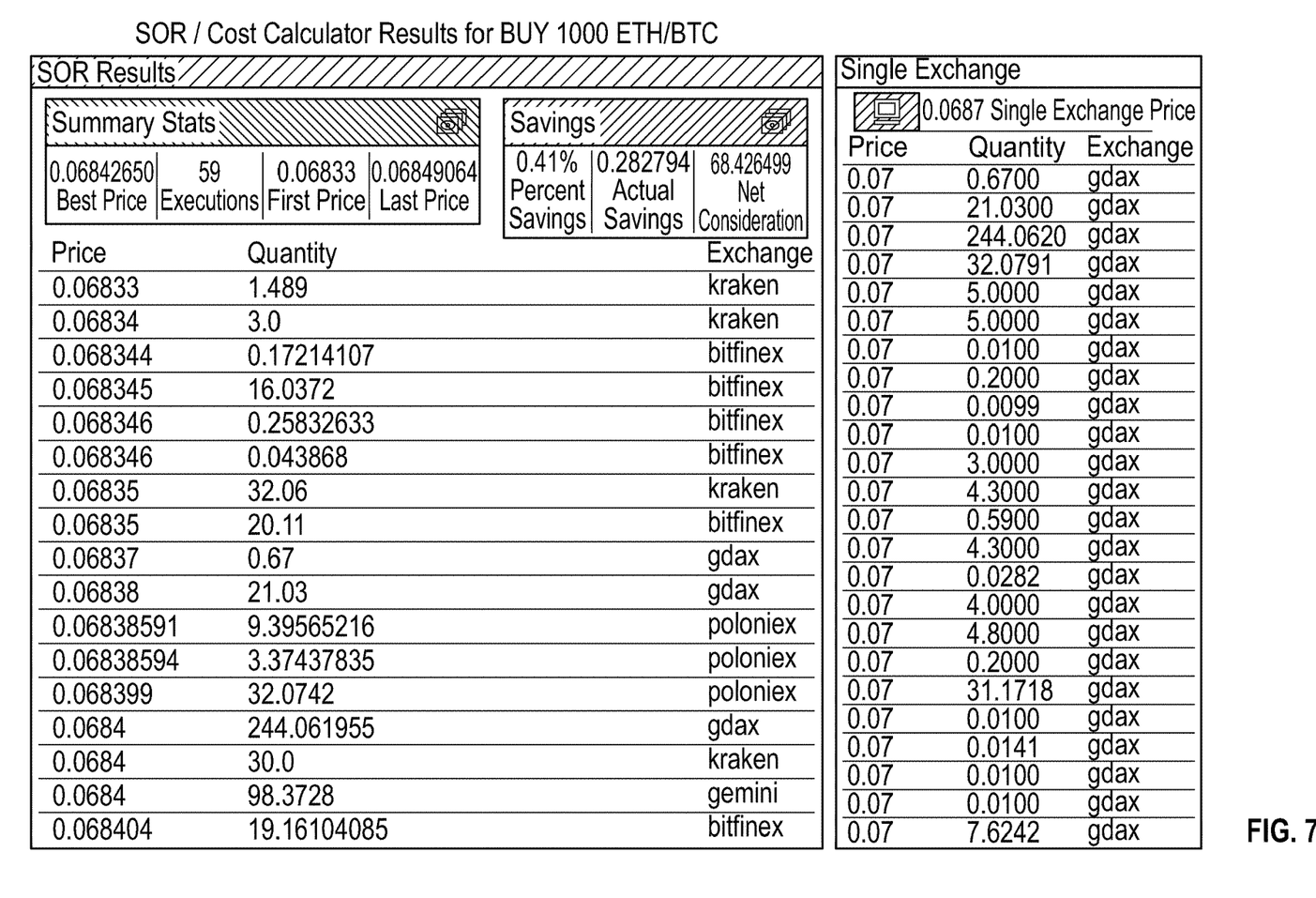
FIG. 7 shows the results from the working user interface where the user selected a BUY order for 1000 ETH denominated in BTC, compared to GDAX as a single exchange.

Architecture: The architecture of the DCCSOR is a distributed Smart Order Router (SOR) connected to a Decision Engine which connects to a Market Data Service. The SOR is deployed within the client virtual private cloud, with access to the client wallets and exchange accounts as depicted in FIG. 1, while the Decision Engine and Market Data Service are centrally housed within their own virtual private cloud, along with a UI framework that provides access to the cost calculator as well as displays of calculated cryptocurrency market data.

Distributed Smart Order Router: The SOR performs four functions: collection of user input and information, packaging of metadata for delivery to the decision engine, creation and sending of order instructions to exchanges, and collection of execution information for reporting back to the user or creation of subsequent metadata for a next round orders.

Collection of user input and information. For each transaction, the SOR accepts user input for the product-pair, a buy-sell indicator, quantity, limit price, and optionally a routing strategy. The buy-sell indicator and the quantity are interpreted by the SOR, in all cases, relative to the primary product. The limit price refers to the maximum (if a buy) or minimum (if a sell) price, in terms of the pricing currency, for the execution of the transaction. This information is collectively referred to in the rest of this document as the order parameters. In addition to user input of the order parameters, the Distributed SOR Client (DSC) must also have access to the exchange keys, and the Distributed SOR Decision Engine (DSDE) must have access to account balance information, at each exchange, of both the primacy and pricing currency in the cryptocurrency pair being traded.

Packaging of metadata for delivery to the decision engine. The order parameters are included along with account balance and exchange eligibility information in the Metadata that is pushed to the virtual private cloud of the centralized service to be used by the decision engine. While the Distributed SOR Client (DSC) could be enabled by the customer to utilize the keys to query each exchange directly for the account balances, the client could also provide those balances and exchange eligibility directly to a central version of the SOR that runs in the same private cloud as the decision engine. This is an important part of the design, because the client keys are only used by the Distributed SOR Client to transact with the exchanges and are not passed outside of the client's virtual private cloud when the DSC is operated in the distributed mode.

Creation and sending of order instructions to exchanges. The Distributed SOR Client receives a package of order instructions from the Decision Engine, including quantity, limit price and order type information for each exchange in a common format, or, in certain cases, instructions to transfer cryptocurrencies from one wallet to another. The DSC is responsible for formatting the specific orders to transfer instructions into the APIs of each exchange and transmitting them, while local plugins store all API keys locally and can communicate with a local wallet for p2p execution.

Collection of execution information. The Distributed SOR Client receives the execution reports back from the exchanges along with any cancelation or other messages. The DSC reports each execution to both the client system and the User Interface for display. If the order submitted by the client was not completely filled, after all the reports from the exchanges are received, the subsequent action is determined by the routing strategy and the client limit price. Depending on the routing strategy, the DSC will either leave orders unfilled on the exchanges, or cancel those orders. If orders are left unfilled on the exchanges, the Distributed SOR Client will wait until either they are filled or the client instructs the DSC to take further action. If the DSC cancels those orders, and the routing strategy warrants it, the DSC will send new metadata to the decision engine to continue trying to execute the original order.

The Distributed SOR Client software will be open-source and can prompt the user to accept an execution before proceeding. This protects the user against compromised data feeds.

Market Data Service: The market data service is composed of a set of real time feed handlers and APIs that feed a real-time database that captures bids and offers at every exchange in time sequence. The service can create, on demand, a composite order book with all of the bids and offers across the requested exchanges. This allows the decision engine to get a view of the order book limited by the exchanges for which the client is eligible to trade. Lastly, the market data service can create historical datasets for the creation of statistical analytics that can be used by the decision engine and other user interface functions.

Decision Engine: The decision engine houses all the routing strategy logic in the system including the interpretation of client instructions and account information to frame its data acquisition, and the calculation of what orders to send to each exchange to achieve the optimal price. For sell orders, it also evaluates potential cryptocurrency transfers in situations where the client assets are not housed at the exchange with the best price.

Interpretation of client instructions. The decision engine utilizes the product-pair, buy-sell indicator and limit price to properly select the market data required to make its determination. It will request the full depth of bids to the limit price if the client is selling and the full depth of offers to the limit price if the client is buying. If the client does not have a limit price, then the decision engine will request the full depth of book on the appropriate side.

Interpretation of account information. The decision engine will use the client account information to request that the market data service return only the data for exchanges where the client has accounts. It also uses the account information, in the case of buy orders, to determine the client's buying power on each exchange, and, in the case of sell orders, the amount of the primary cryptocurrency held at each exchange that is eligible for sale.

Calculation of orders to send. The decision engine will, subject to the constraints imposed by the client account information, calculate the orders to be sent to each exchange to achieve the optimal price based on the filtered, composite order book returned by the market data service. The decision engine will aggregate the quantity per exchange it should send to each, by adding the quantity of each order in the composite book on each exchange in price order to a running total for each. For buy orders, the calculation starts at the lowest offer price and concludes when the total quantity aggregated across exchanges equals the client order size.

For sell orders, if the client has enabled the feature, the decision engine will determine both an optimal set of orders for all the exchanges the client is eligible to trade on, as well as a set of orders subject to the current constraints of the account holdings. The decision engine will then calculate, based on a statistical formula that analyzes the volatility of the product compared to the relative price advantage of trading on exchanges where the client has insufficient inventory, to determine if it would be advantageous to initiate a transfer of the product to that exchange before passing the sell orders to the SOR. This feature is based on a model that incorporates a predicted volatility calculation to assess the risk of waiting for the time that the engine predicts it will take to transfer the product.

Cost Calculator: The cost calculator software utilizes the same logic as the decision engine to determine the optimal set of orders, and then displays the results. It shows the potential aggregate execution price, cost savings, aggregate executions per exchange and individual orders the SOR would send, compared to the aggregate execution price and individual orders that would be sent to the selected individual exchange.

It also includes an interface that allows the client to choose which exchanges to include when routing, if they wish to include exchanges for any reason.

What is claimed is:

1. A system comprising:
   a decision engine operating within a central Virtual Private Cloud (VPC), wherein the decision engine does not have access to one or more exchange API keys of a first user; and
   a first order router operating within a first client VPC, wherein the first order router has access to the one or more exchange API keys of the first user;
   wherein the decision engine is configured to:
   obtain, from the first order router, a metadata set based on a plurality of order parameters from the first user;
   obtain offer and bid information for two or more cryptocurrency exchanges, based on the metadata set;
   determine a plurality of orders associated with a plurality of the two or more cryptocurrency exchanges based on the offer and bid information and the metadata set; and
   format the plurality of orders to create a package of order instructions for the first order router;
   wherein the first order router is configured to:
   receive the plurality of order parameters from the first user;
   transmit, to the decision engine, the metadata set based on the plurality of order parameters;
   receive, from the decision engine, the package of order instructions;
   format the package of order instructions to create a plurality of orders for the plurality of the two or more cryptocurrency exchanges; and
   transmit the plurality of orders to the plurality of the two or more cryptocurrency exchanges.

2. The system of claim 1, wherein the plurality of order parameters comprises: a product-pair, a buy-sell indicator, a quantity, a limit price, a routing strategy, or any combination thereof.

3. The system of claim 1, wherein the first order router is configured to package the metadata set based on the plurality of order parameters.

4. The system of claim 1, wherein the metadata set comprises one or more of an account balance and exchange eligibility information of the first user at the two or more cryptocurrency exchanges.

5. The system of claim 4, wherein the first order router is configured to query one or more of the account balance and the exchange eligibility information from the two or more cryptocurrency exchanges.

6. The system of claim 1, wherein the first order router has access to one or more local plugins storing the one or more exchange API keys locally.

7. The system of claim 1, wherein the package of order instructions comprises order type information for a plurality of exchanges in a common format.

8. The system of claim 1, wherein the first order router is configured to communicate with the plurality of the two or more cryptocurrency exchanges using a locally stored exchange API keys corresponding to the plurality of the two or more cryptocurrency exchanges.

9. The system of claim 1, wherein the first order router is configured to receive execution reports from the plurality of the two or more cryptocurrency exchanges.

10. The system of claim 1, further comprising a market data service operating within the central VPC, wherein the market data service is configured to obtain the offer and bid information for the two or more cryptocurrency exchanges.

11. The system of claim 10, wherein the market data service is configure to provide a composite order book to the decision engine.

12. The system of claim 1, further comprising a UI component operating within the central VPC, wherein the UI component is configured to provide one or more of access to a cost calculator, and a display of calculated cryptocurrency market data.

13. The system of claim 1, further comprising a second order router operating with a second client VPC.

14. The system of claim 13, wherein the decision engine does not have access to one or more exchange API keys of a second user and wherein the second order router has access to the one or more exchange API keys of the second user.

15. A method comprising:
    at a decision engine operating within a central Virtual Private Cloud (VPC), wherein the decision engine does not have access to one or more exchange API keys of a first user:
    obtaining, from the first order router, a metadata set based on a plurality of order parameters from the first user;
    obtaining offer and bid information for two or more cryptocurrency exchanges, based on the metadata set;
    determining a plurality of orders associated with a plurality of the two or more cryptocurrency exchanges based on the offer and bid information and the metadata set; and
    formatting the plurality of orders to create a package of order instructions for the first order router;
    at a first order router operating within a first client VPC, wherein the first order router has access to the one or more exchange API keys of the first user:
    receiving the plurality of order parameters from a user;
    transmitting, to a decision engine, the metadata set based on the plurality of order parameters;
    receiving, from the decision engine, the package of order instructions;
    formatting the package of order instructions to create a plurality of orders for the plurality of the two or more cryptocurrency exchanges; and
    transmitting the plurality of orders to the plurality of the two or more cryptocurrency exchanges.

* * * * *